(12) United States Patent
Dhurandhar et al.

(10) Patent No.: US 11,972,344 B2
(45) Date of Patent: Apr. 30, 2024

(54) SIMPLE MODELS USING CONFIDENCE PROFILES

(71) Applicant: International Business Machines Corporation, Armonk, NY (US)

(72) Inventors: Amit Dhurandhar, Yorktown Heights, NY (US); Karthikeyan Shanmugam, Yorktown Heights, NY (US); Ronny Luss, Yorktown Heights, NY (US); Peder Andreas Olsen, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 767 days.

(21) Appl. No.: 16/202,265

(22) Filed: Nov. 28, 2018

(65) Prior Publication Data

US 2020/0167642 A1 May 28, 2020

(51) Int. Cl.
*G06N 3/08* (2023.01)

(52) U.S. Cl.
CPC ........................ *G06N 3/08* (2013.01)

(58) Field of Classification Search
CPC ................................. G06N 3/08; G06N 20/00
See application file for complete search history.

(56) References Cited

U.S. PATENT DOCUMENTS

| | | | |
|---|---|---|---|
| 8,495,077 B2 | 7/2013 | Bayliss | |
| 9,292,267 B2 | 3/2016 | Boag et al. | |
| 9,501,749 B1* | 11/2016 | Narsky | G06N 7/023 |
| 9,836,510 B2 | 12/2017 | Love et al. | |
| 9,946,924 B2 | 4/2018 | Sengupta et al. | |
| 10,043,221 B2 | 8/2018 | Bostick et al. | |
| 10,061,835 B2 | 8/2018 | Blanco et al. | |
| 2008/0147579 A1* | 6/2008 | Gao | G10L 15/197 706/25 |
| 2015/0095017 A1* | 4/2015 | Mnih | G06F 40/284 704/9 |
| 2016/0212115 A1 | 7/2016 | Hamlin et al. | |
| 2016/0283814 A1* | 9/2016 | Jin | G06V 30/2445 |
| 2017/0308807 A1 | 10/2017 | Hauth et al. | |
| 2018/0060734 A1 | 3/2018 | Beller et al. | |
| 2018/0232837 A1 | 8/2018 | Dill | |
| 2018/0255010 A1 | 9/2018 | Goyal et al. | |
| 2018/0260543 A1 | 9/2018 | Seth et al. | |
| 2018/0308487 A1* | 10/2018 | Goel | G10L 15/26 |

OTHER PUBLICATIONS

Sandra Mau, "Gaussian Probabilistic Confidence Score for Biometric Applications", IEEE Xplore, Jan. 17, 2013 (Year: 2013).*

(Continued)

*Primary Examiner* — Michael J Huntley
*Assistant Examiner* — Imad Kassim
(74) *Attorney, Agent, or Firm* — Jordan T. Schiller

(57) ABSTRACT

A method, system, and computer program product, including generating, using a linear probe, confidence scores through flattened intermediate representations and theoretically-justified weighting of samples during a training of the simple model using the confidence scores of the intermediate representations.

24 Claims, 11 Drawing Sheets

(56) References Cited

OTHER PUBLICATIONS

Koby Crammer, "Confidence-Weighted Linear Classification for Text Categorization", Journal of Machine Learning Research 13 (2012) 1891-1926 (Year: 2012).*
Parisotto et al. ("Actor-Mimic Deep Multitask and Transfer Reinforcement Learning", ICLR 2016)) (Year: 2016).*
Liu et al ("Improving the Interpretability of Deep Neural Networks with Knowledge Distillation", 2018 IEEE, Date of Conference: Nov. 17-20, 2018) (Year: 2018).*
Alain et al. ("Understanding intermediate layers using linear classifier probes", NIPS 2016) (Year: 2016).*
Jayadeva et al. ("Learning Neural Network Classifiers with Low Model Complexity", IEEE 2017) (Year: 2017).*
Wang et al. ("High dimensional data regression using Lasso model and neural networks with random weights", Information Sciences, vol. 372, 2016, pp. 505-517) (Year: 2016).*
Alain et al. ("Understanding intermediate layers using linear classifier probes", arxiv, 2018) (Year: 2018).*
Toh et al. (NPL; "Maximizing area under ROC curve for biometric scores fusion", vol. 41, Issue 11, 2008, pp. 3373-3392 ) (Year: 2008).*
Mel, et al. "The NIST Definition of Cloud Computing". Recommendations of the National Institute of Standards and Technology. Nov. 16, 2015.
Bolin, David; "A Brief Introduction to Mixed Models", University of Gothenburg, Gothenburg, Apr. 6, 2017, pp. 1-30.
Gimenez et al.; "Efficient Profile-Likelihood Confidence Intervals for Capture-Recapture Models", Journal of Agri., Biol., and Envir. Stat., vol. 10, No. 2, Feb. 15, 2005, pp. 1-13.
MacKay et al.; "Calibration With Confidence: A Principled Method for Panel Assessment", Royal Society Open Science, Feb. 8, 2017, pp. 1-21.
Crammer et al.; "Confidence-Weighted Linear Classification for Text Categorization", Journal of Machine Learning Research, vol. 13, Iss. 1, Jan. 2012, pp. 1891-1926.

* cited by examiner

| GENERATING, USING LINEAR PROBE(S), CONFIDENCE SCORES THROUGH FLATTENED INTERMEDIATE REPRESENTATIONS | —101 |

| THEORETICALLY JUSTIFIED WEIGHTING OF SAMPLES DURING A TRAINING OF THE SIMPLE MODEL USING THE CONFIDENCE SCORES OF THE INTERMEDIATE REPRESENTATIONS | —102 |

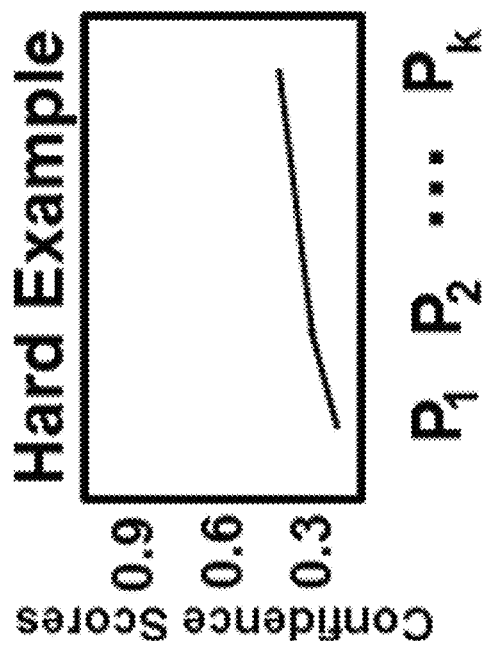
FIG. 4A
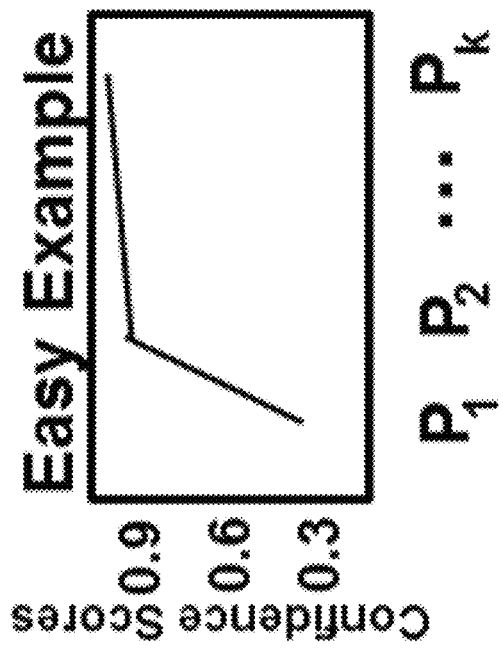
FIG. 4B

Algorithm 1

Input: $k$ unit neural network $\mathcal{N}$, learning algorithm for simple model $\mathcal{L}_S$, dataset $D_\mathcal{N}$ used to train $\mathcal{N}$, dataset $D_S = \{(x_1, y_1), ..., (x_m, y_m)\}$ to train a simple model and margin parameter $\alpha$.

1) Attach probes $P_1, ..., P_k$ to the $k$ units of $\mathcal{N}$.
2) Train probes based on $D_\mathcal{N}$ and obtain errors $e_1, ..., e_k$ on $D_S$. (There is no backpropagation of gradients here to the hidden units/layers of $\mathcal{N}$.)
3) Train the simple model $S \leftarrow \mathcal{L}_S(D_S, \beta, \mathbf{1}_m)$ and obtain its error $e_S$. ($S$ is obtained by unweighted training. $\mathbf{1}_m$ denotes a $m$ dimensional vector of 1s.)
4) Let $I \leftarrow \{u \mid e_u \leq e_S - \alpha\}$ ($I$ contains indices of all probes that are more accurate than the simple model $S$ by a margin $\alpha$ on $D_S$.)
5) Compute weights $w$ using Algorithm 2 or 3 for AUC or neural network, respectively.
6) Obtain simple model $S_{w,\beta} \leftarrow \mathcal{L}_{S,\beta}(D_S, \beta, w)$ (Train the simple model on $D_S$ along with the weights $w$ associated with each input.)

return $S_{w,\beta}$

FIG. 6

Algorithm 2

Input: Neural network $\mathcal{N}$, probes $P_u$, dataset $D_S$, and index set $I$ from Algorithm 1.

1) Set $i \leftarrow 1$, $w = \vec{0}_m$ ($m$-vector of zeros)
while $i \leq m$ do
   2) Obtain confidence scores $\{c_{iu} = P_u(R_u(x_i))[y_i] \mid u \in I\}$.
   3) Compute $w_i \leftarrow \frac{1}{|I|} \sum_{u \in I} c_{iu}$ (In other words, estimate AUC for sample $(x_i, y_i) \in D_S$ based on probes indexed by $I$. $|\cdot|$ denotes cardinality.)
   4) Increment $i$, i.e., $i \leftarrow i + 1$
end while
return $w$

FIG. 7

Algorithm 3

Input: Weight space $C$, dataset $D_S$, # of iterations $N$ and index set $I$ from Algorithm 1.

1) Obtain confidence scores $\{c_{iu} = P_u(R_u(x_i))[y_i] \mid u \in I\}$ for $x_i$ when predicting the class $y_i$ using the probes $P_u$ for $i \in \{1, \ldots, m\}$.
2) Initialize $i = 1$, $w^0 = \vec{1}_m$ and $\beta^0$ (simple model parameters)
while $i \leq N$ do
   3) Update simple model parameters: $\beta^i = \operatorname{argmin}_\beta \sum_{j=1}^m \lambda(S_{w^{i-1}, \beta}(x_j), y_j)$
   4) Update weights: $w^i = \operatorname{argmin}_{w \in C} \sum_{j=1}^m \lambda(S_{w, \beta^i}(x_j), y_j) + \gamma \mathcal{R}(w)$, where $\mathcal{R}(\cdot)$ is a regularization term set to $(\frac{1}{m} \sum_{i=1}^m w_i - 1)^2$ with scaling parameter $\gamma$. (Note that the weight space $C$ restricts $w$ to be a neural network that takes as input the confidence scores $c_{iu}$.)
   5) Increment $i$, i.e., $i \leftarrow i + 1$
end while
return $w = w^N$

|  | SM-3 | SM-5 | SM-7 | SM-9 |
|---|---|---|---|---|
| Standard | 73.15(± 0.7) | 75.78(±0.5) | 78.76(±0.35) | 79.9(±0.34) |
| ConfWeight | 76.27 (±0.48) | 78.54 (±0.36) | 81.46(±0.50) | 82.09 (±0.08) |
| Distillation | 65.84(±0.60) | 70.09 (±0.19) | 73.4(±0.64) | 77.30 (±0.16) |
| ProfWeight$^{ReLU}$ | 77.52 (±0.01) | 78.24(±0.01) | 80.16(±0.01) | 81.65 (±0.01) |
| ProfWeight$^{AUC}$ | 76.56 (±0.62) | 79.25(±0.36) | 81.34(±0.49) | 82.42 (±0.36) |

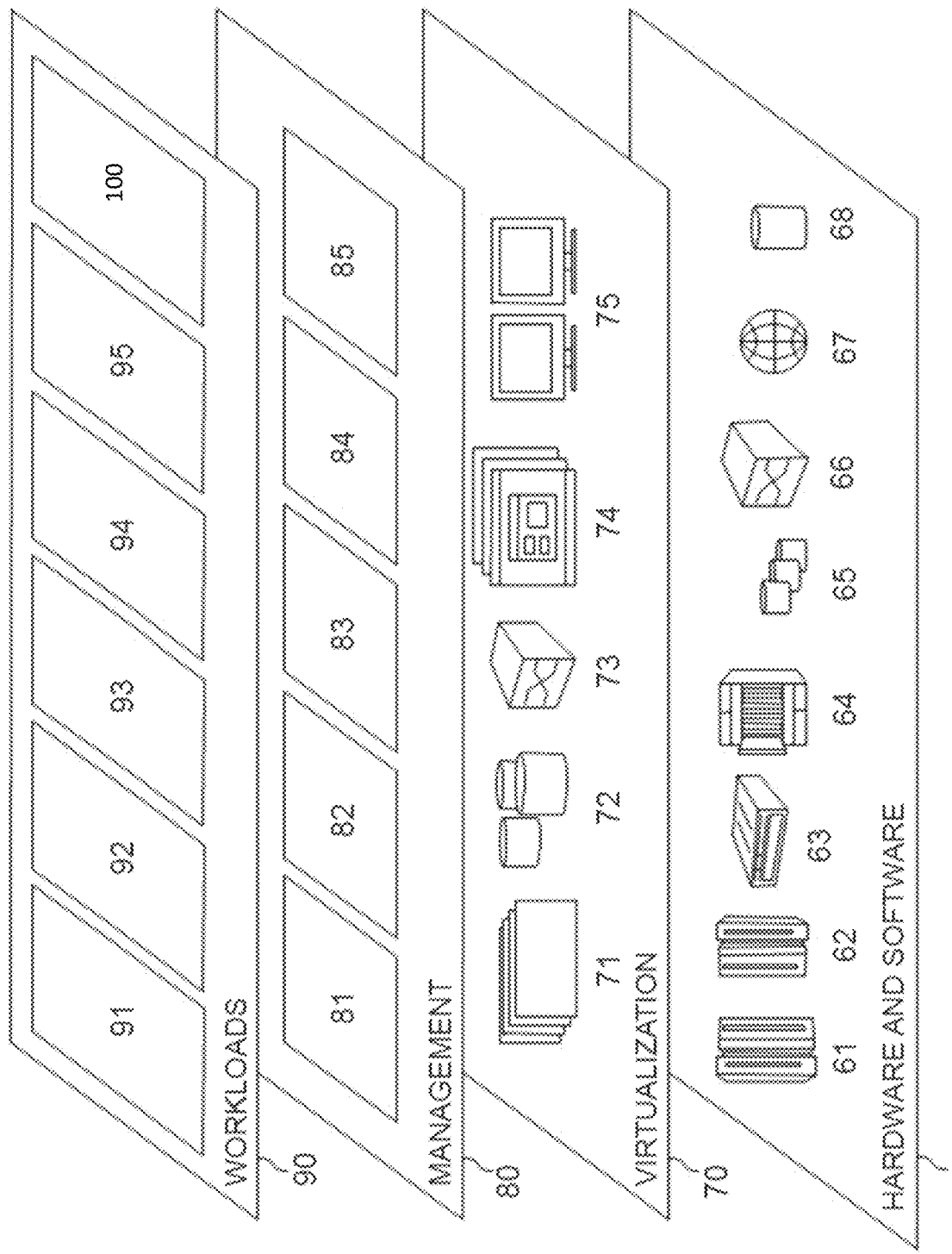

SIMPLE MODELS USING CONFIDENCE PROFILES

BACKGROUND

The present invention relates generally to a method for improving simple models using confidence profiles, and more particularly, but not by way of limitation, to a system, method, and recording medium for improving a performance of simpler models using information from high performing complex models by transferring information from a pre-trained deep neural network that has a high test accuracy to a simpler interpretable model or a very shallow network of low complexity and a priori low test accuracy.

Complex models such as deep neural networks (DNN) have shown success in applications such as computer vision, speech and time series analysis. One of the primary concerns with these models has been their lack of transparency, which has curtailed their widespread use in domains where human experts are responsible for critical decisions.

Recognizing this limitation in the conventional techniques, there has been a surge of techniques recently to make deep networks more interpretable. These techniques highlight important features that contribute to the particular classification of an input by a deep network and have been shown to reasonably match human intuition.

Other conventional techniques include interpretability and model deployment in severely memory-constrained environments (e.g., like sensors). Probes have been used before, but for a different purpose. For instance, one technique used probes to study properties of the neural network in terms of its stability and dynamics, but not for information transfer (i.e., as in the present invention).

Thus, there is a need in the art for an intuitive model agnostic method to enhance the performance of simple models (i.e., lasso, decision trees, etc.) using a pre-trained deep network.

SUMMARY

In view of the technical problems in the art, the inventors have invented a technical improvement to address the technical problem that includes transferring information from a pre-trained deep neural network that has a high test accuracy to a simpler interpretable model or a very shallow network of low complexity and a priori low test accuracy by, for example, using linear probes to generate confidence scores through flattened intermediate representations. The transfer method involves a theoretically-justified weighting of samples during the training of the simple model using confidence scores of these intermediate layers.

In an exemplary embodiment, the present invention can provide a computer-implemented method for improving a simple model using a confidence profile, the method including generating, using a linear probe, confidence scores through flattened intermediate representations and theoretically-justified weighting of samples during a training of the simple model using the confidence scores of the intermediate representations.

One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which:

FIG. 1 exemplarily shows a high-level flow chart for a method 100;

FIGS. 4A-4B exemplarily depict an 'easy' and 'hard' example plot of an easy and hard example to classify "4" according to an embodiment of the invention;

FIG. 5 exemplarily depicts a first algorithm according to an embodiment of the present invention;

FIG. 6 exemplarily depicts a second algorithm according to an embodiment of the present invention;

FIG. 7 exemplarily depicts a third algorithm according to an embodiment of the present invention;

FIG. 13 depicts abstraction model layers according to an embodiment of the present invention.

DETAILED DESCRIPTION

Figure 2:
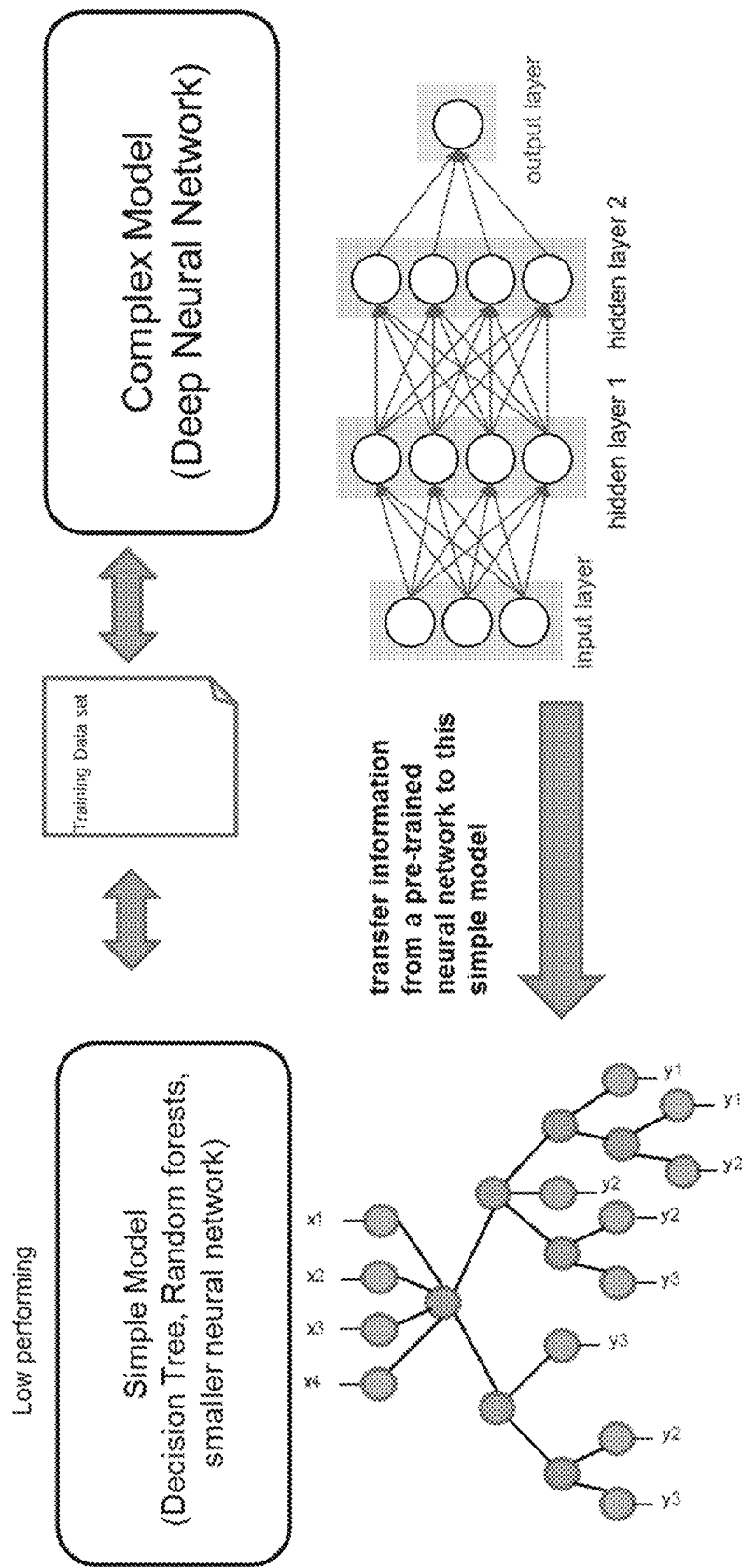
FIG. 2 exemplarily depicts high level technique for implementing the method 100 according to an embodiment of the present invention.

The invention will now be described with reference to FIG. 1-13, in which like reference numerals refer to like parts throughout. It is emphasized that, according to common practice, the various features of the drawings are not necessarily to scale. On the contrary, the dimensions of the various features can be arbitrarily expanded or reduced for clarity.

With reference now to the example depicted in FIG. 1, the method 100 includes various steps for improving the performance of a learning model using information from another high performing model with applications to, for example, improve the interpretability or explain an ability of artificial intelligence, improve resource-constrained settings, and improve transfer learning.

Figure 11:
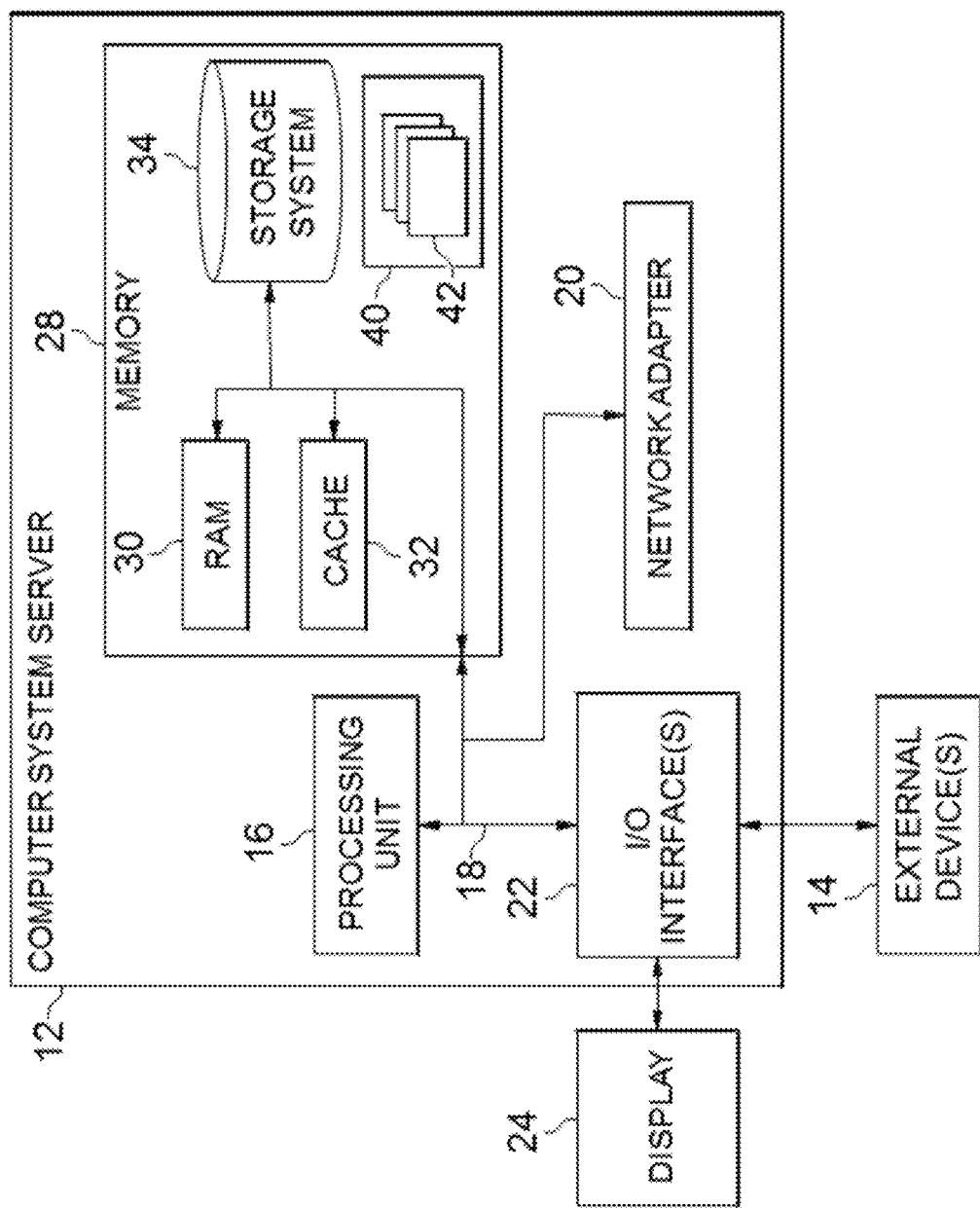
FIG. 11 depicts a cloud computing node 10 according to an embodiment of the present invention.

As shown in at least FIG. 11, one or more computers of a computer system 12 according to an embodiment of the present invention can include a memory 28 having instructions stored in a storage system to perform the steps of FIG. 1.

Although one or more embodiments (see e.g., FIGS. 11-13) may be implemented in a cloud environment 50 (see e.g., FIG. 12), it is nonetheless understood that the present invention can be implemented outside of the cloud environment.

Figure 3:
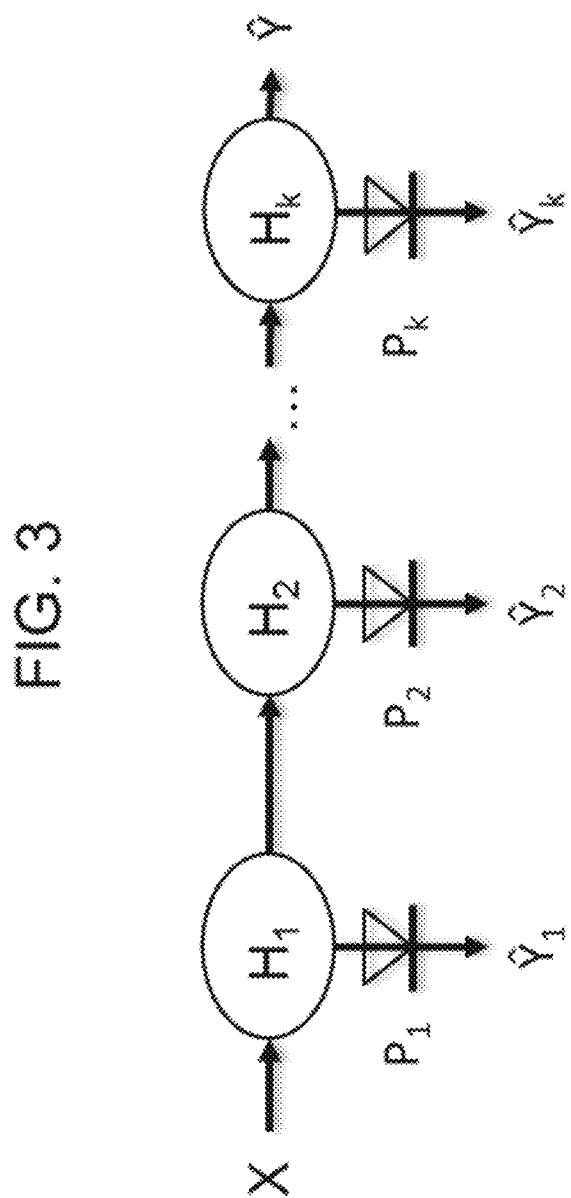
FIG. 3 exemplarily depicts the k hidden representations H1 . . . Hk of a pre-trained neural network using probes to implement the method 100 according to an embodiment of the present invention.

With reference generally to FIGS. 1-4, the invention proposes a method where probes are added to the intermediate layers of a deep neural network (DNN). A probe is essentially a logistic classifier (e.g., linear model with bias followed by a softmax) added to an intermediate layer of a pre-trained neural network so as obtain its predictions from that layer. These are called 'linear probes' throughout this disclosure. This is depicted in FIG. 3, where k probes are added to k hidden layers. Note that there is no backpropagation of gradients through the probes to the hidden layers. In other words, the hidden representations are fixed once the neural network is trained with only the probes being updated to fit the labels based on these previously learned representations. Thus, results in high test accuracy and confidence scores and lower complexity of the model.

Also, it is noted that adding probes to each layer in the network is not required. One may do so only at certain layers which represent logical units for a given neural network architecture.

More specifically, in FIG. 3, k hidden representations $H_1 \ldots H_k$ of a pre-trained neural network are shown. The diode symbols (triangle with vertical line) attached to each $H_i \ \forall i \in \{1, \ldots, k\}$ denote the probes $P^i$, with the $\hat{Y}_i$(I being an integer) denoting the respective outputs.

The confidence scores of the true label of an input when plotted at each of the probe outputs form a curve that that is referred to as confidence profile for that input. This is seen in FIGS. 4-5. These confidence profiles are used to improve the simple model as shown as the general idea in FIG. 2. For purposes of the invention, 'simple model' is defined as one that humans can understand/interpret directly or one that adheres to strict memory constraints. Functions of these confidence scores are considered starting from an intermediate layer up to the final layer to weight samples during training of the simple model. The first function that is considered, area under the curve (AUC) traced by the confidence scores, shows much improvement in the simple models performance. Then, the invention considers learning the weights using neural networks that take as an input the confidence scores and output an optimal weighting. Choice of the intermediate layers is based on the simple model's complexity as is described later.

For example, as shown in FIGS. 4A-B, example plots are created by plotting the confidence score of the true label at each probe. In FIG. 4A, it can be seen that a well written digit "4" which possibly is an easy example to classify and hence the confidence scores are high even at lower level probes. This sharply contrasts the curve in FIG. 4B, which is for a much harder example of digit "4".

Using the method 100, it is observed in experiments (as described later) that the method 100 improves performance of simple models that are desirable in the respective domains. On one example database, the method 100 improves a simple neural network with very few (i.e., low computing requirements) Resnet blocks which can be deployed on UAVs and in Internet of Things (IoT) applications where there are memory and power constraints. On a real manufacturing dataset, the method 100 significantly improves a decision tree classifier, which is the method of choice of a fab engineer working in an advanced manufacturing plant.

The primary intuition behind the method 100 is to identify examples that the simple model will most likely fail on (i.e., identify truly 'hard' examples as shown in FIG. 4B). The method then informs the simple model to ignore these examples and make it expend more effort on other relatively easier examples that it could perform well on, with the eventual hope of improving generalization performance. This is analogous to a teacher (i.e., complex model) informing a student (i.e., simple model) about aspects of the syllabus he should focus on and which he/she could very well ignore since it is way above his/her current level.

That is, the method 100 provides a technique to transfer information from a complex model to a simple one by characterizing the hardness (e.g., difficulty for completing the computation is greater than a predetermined threshold value based on the computing capability) of examples. It is noted that 'hardness' is the difficulty of a classifier (e.g., in this case the simple model) to classify an example into the correct class. Using the method 100, one is able to identify which examples will be 'hard'/'easy' for the simple model to classify. This is done with the help of confidence profiles that are obtained by adding probes to different layers of a neural network. That is, in step 101, using linear probes, confidence scores are generated through flattened intermediate representations.

With reference back to FIGS. 4A-B, the intuition is that easy examples should be resolved by the network, that is, classified correctly with high confidence at lower layer probes themselves. In contrast, hard examples would either not be resolved at all or be resolved only at or close to the final layer probes. This captures the notion of the network having to do more work and learn more finely grained representations for getting the harder examples correctly classified. One way to capture this notion is to compute the area under the curve (AUC) traced by the confidence scores at each of the probes for a given input-output pair. AUC amounts to averaging the values involved. Thus, as seen in FIGS. 4A-B, the higher the AUC, the easier is the example to classify. Note that the confidence scores are for the true label of that example and not for the predicted label, which may be different.

A truly 'hard' example is one that is more of an outlier than a prototypical example of the class to which it belongs. In other words, if X×Y denotes the input-output space and p(x, y) denotes the joint distribution of the data, then a hard example $(x_h, y_h)$ has low $p(y_h | x_h)$.

A learning algorithm $L_S$ is trying to learn a simple model that "best" matches p(y|x) so as to have low generalization error. The dataset $D_S = \{(x_1, y_1), \ldots, (x_m, y_m)\}$, which may or may not be representative of p(x, y), but which is used to produce the simple model, may not produce this best match. The invention thus has to bias the $D_S$ and/or the loss of $L_S$ so that a best match is produced. The most natural way to bias is by associating weights $W = \{w_1, \ldots, w_m\}$ with each of the m examples $(x_1, y_1), \ldots, (x_m, y_m)$ in $D_S$. The goal here, however, is not to match distributions but to bias the dataset in such a way that one produces the best performing simple model.

Thereby, if $\lambda(.,.)$ denotes a loss function, w a vector of m weights to be estimated for examples in the $D_S$, and $S_{w,\beta} = L_S(D_S, \beta, w)$ is a simple model with parameters $\beta$ that is trained by $L_S$ on the weighted dataset. C is the space of allowed weights based on constraints (i.e., penalty on extremely low weights) that would eliminate trivial solutions such as all weights being close to zero, and B is the simple model's parameter space. Then equation (1) (i.e., optimization problem) is solved:

$$S^* = S_{w^*, \beta^*} = \min_{w \in C} \min_{\beta \in B} E[\lambda(S_{w,\beta}(x), y)] \quad (1)$$

That is, equation (1) enables learning the optimal simple model S* by estimating the corresponding optimal weights W* which are used to weight examples in $D_S$. The method 100 does not just rely on the output confidence score for the true label, as is described next.

Via the first, second, and third algorithms depicted in FIGS. 5-7, the complex model N is trained on a data set $D_N$ and then the resulting weights are frozen. Regarding the notations, let U be the set of logical units whose representations are used to train probes, and let $R_u(x)$ denote the flattened representation after the logical unit u on input x to the trained network N. A probe function $P_u(\bullet) = \sigma(Wx+b)$, where $W \in k \times |R_u(x)|$, $b \in \mathbb{R}^k$, $\sigma(\bullet)$ is the standard softmax function, and k is the number of classes, on the flattened representations $R_u(x)$ is trained to optimize the cross-entropy with the labels y in the training data set $D_N$. For a label y among the class labels, $P_u(R_u(x))[y] \in [0, 1]$ denotes the confidence score of the probe on label y.

Given that the simple model may have a certain performance, the invention is preferably not intended to use very low-level probe confidence scores to convey hardness of examples to it. The weights in Algorithm 1 shown in FIG. 5 are computed only based on those probes that are (roughly) more accurate than the simple model. A parameter a which can be thought of as a margin parameter determining how much better the weakest teacher should he is used. The higher the α, the better the worst performing teacher will be. As is shown in the experiments described later, it is not always optimal to only use the best performing model as the teacher, since, if the teacher is highly accurate, all confidences will be at or near '1' which will provide no useful information to the simple student model.

With reference specifically to the Algorithm 1 shown in FIG. 5 (i.e., 'ProfWeight'), at a high level it can be described as performing the following steps of attach and train probes on intermediate representations of a high performing neural network, train a simple model on the original dataset, learn weights for examples in the dataset as a function (AUC or neural network) of the simple model and the probes, and retrain the simple model on the final weighted dataset.

In step (5) of the Algorithm 1, one can compute weights either as the AUC (Algorithm 2) (See FIG. 6) of the confidence scores of the selected probes or by learning a regularized neural network (Algorithm 3) (See FIG. 7) that inputs the same confidence scores.

In Algorithm 3, one sets the regularization term $$\tilde{\mathcal{R}}(w) = \left(\frac{1}{m}\sum_{i=1}^{m^*} w_i - 1\right)^2$$

to keep the weights from all going to zero. Also, a penalty is imposed on the weights in Algorithm 3 so as to prevent the weights from diverging. Note that, while the neural network is trained using batches of data, the regularization is still a function of all training samples. Algorithm 3 alternates between minimizing two blocks of variables (w and β). When the sub-problems have solutions and are differentiable, all limit points of $(w_k, \beta_k)$ can be shown to be stationary points. The final step of 'ProfWeight' (i.e., Algorithm 1) is to train the simple model on $D_S$ with the corresponding learned weights.

With reference to FIG. 1, in step 102, the weighting of samples during a training of the sample model is theoretically-justified using the confidence scores of the intermediate representations. That is, a justification for the regularized optimization in Step 4 of Algorithm 3 (See FIG. 7) is provided. Intuitively, a pre-trained complex model is provided that has high accuracy on a test data set $D_{test}$. Consider the binary classification setting. It is assumed that $D_{test}$ has samples drawn from a uniform mixture of two class distributions: P (x|y=0) and P (x|y=1). There is another simple model, which is trained on a training set $D_{train}$ and has a priori low accuracy on the $D_{test}$. One would like to modify the training procedure of the simple model such that the test accuracy could be improved.

For example, suppose, training the simple model on training dataset $D_{train}$ results in classifier M. One views this training procedure of simple models through a different lens, as it is equivalent to the optimal classification algorithm trained on the following class distribution mixtures: PM (x|y=1) and PM (x|y=0). This distribution is referred to as $\dot{D}_{train}$. If one knew $P_M$, the ideal way to bias an entry (x, y) ∈ $\dot{D}_{train}$ in order to boost test accuracy would be to use the following importance sampling weights $$w(x, y) = \frac{P(x \mid y)}{P_M(x \mid y)}$$

to account for the covariate shift between $\dot{D}_{train}$ and $D_{test}$. Motivated by this, the invention looks at the following parameterized set of weights, $$w_{M'}(x, y) = \frac{P(x \mid y)}{P_{M'}(x \mid y)}$$

or every M' in the simple model class. One now has the following result as 'Theorem 1' If $W_{M'}$ corresponds to weights on the training samples, then the constraint $$\mathbb{E}_{P_M(x|y)}[w_{M'}(x, y)] = 1 \text{ implies that } w_{M'}(x, y) = \frac{P(x \mid y)}{P_M(x \mid y)}.$$

The error of the Bayes optimal classifier trained on a uniform mixture of two class distributions is given by:

$$\min_{\theta} \sum \mathbb{D}[L_{\theta}(x, y)] = \frac{1}{2} - \frac{1}{2}D_{TV}(P(x \mid y = 1), P(x \mid y = 0)) \text{ where } L(\cdot)$$

is the 0, 1 loss function and θ is parameterization over a class of classifiers that includes the Bayes optimal classifier. DTV is the total variation distance between two distributions. P (x|y) are the class distributions in dataset D. From this and Theorem 1, where θ corresponds to the parametrization of the simple model, equation (2) follows that:

$$\min_{M', \theta \text{ s.t. } \mathbb{E}_{\dot{D}_{train}}[w'_M]=1} \mathbb{E}_{\dot{D}}[\omega_{M'}(x, y)L_0(x, y)] =$$

$$\frac{1}{2} - \frac{1}{2}D_{TV}(P(x \mid y = 1), P(x \mid y = 0))$$

The right hand side of equation (2) is indeed the performance of the Bayes Optimal classifier on the test dataset $D_{test}$. This justifies the regularized optimization in Step 4 of Algorithm 3 (See FIG. 7), which is implemented as a least squares penalty. It also justifies the min-min optimization in Equation (1), which is with respect to the weights and the parameters of the simple model.

Experimental Results of the Method 100

Figures 8, 9:
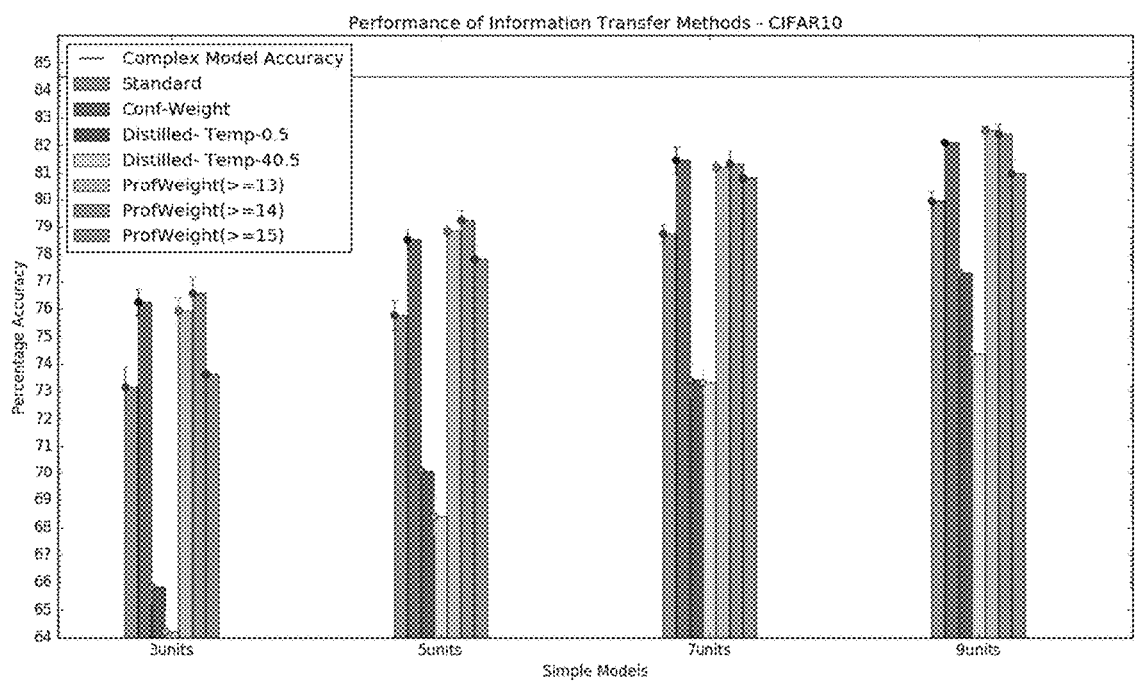
FIG. 8 exemplarily shows averaged accuracies in percentage of a simple model trained with various weighting methods and distillation including the present invention.
FIG. 9 exemplarily shows a performance of the different methods on a database.

In this section, an experiment was performed on datasets from two different domains. The first is a public benchmark vision dataset named CIFAR-10 (i.e., results shown in FIG. 9). The other is a chip manufacturing dataset (i.e., results shown in FIG. 10) obtained from a large corporation. In both cases, one can see the power of the method 100, Prof Weight, in improving the simple model. FIG. 8 shows averaged accuracies (%) of a simple model trained with various weighting methods and distillation.

The method 100 is compared with training the simple model on the original unweighted dataset (Standard). One also compares with 'Distillation', which is a popular method for training relatively simpler neural networks. One lastly compares results with weighting instances just based on the output confidence scores of the complex neural network (i.e. output of the last probe $P_k$) for the true label (i.e., 'Conf-Weight'). This can be seen as a special case of the method where $\alpha$ is set to the difference in errors between the simple model and the complex network.

As is shown in FIG. 8, the complex model achieved 84.5% accuracy. Weighting methods that average confidence scores of higher level probes perform the best or on par with the best in all cases. In each case, the improvement over the unweighted model is about 3-4% in test accuracy. Distillation performs uniformly worse in all cases. One consistently see that the method 100 outperforms these competitors. This showcases the power of the inventive approach in terms of performance and generality, where the simple model may not be minimizing cross-entropy loss, as is usually the case when using Distillation.

With reference to FIG. 8 and FIG. 9, it is clear that in all cases, the weights corresponding to the AUC of the probe confidence scores from unit 13 or 14 and upwards are among the best in terms of test accuracies. They significantly outperform distillation-based techniques and, further, are better than the unweighted test accuracies by 3-4%. This shows that the method 100 (i.e., 'ProfWeight algorithm') performs really well compared with conventional techniques. It is shown that in this case, the confidence scores from the last layer or final probe alone are quite competitive as well. This is due to the complex model accuracy not being very high, having been trained on only 30000 examples. This might seem counterintuitive, but a highly accurate model will find almost all examples easy to classify at the last layer leading to confidence scores that are uniformly close to 1. Weighting with such scores then, is almost equivalent to no weighting at all. This is somewhat witnessed in the manufacturing example where the complex neural network had an accuracy in the 90 s and 'Conf-Weight' did not enhance the CART model to the extent ProfWeight did. In any case, weighting based on the last layer is just a special instance of the inventive method ProfWeight, which is seen to perform quite well.

Figure 10:
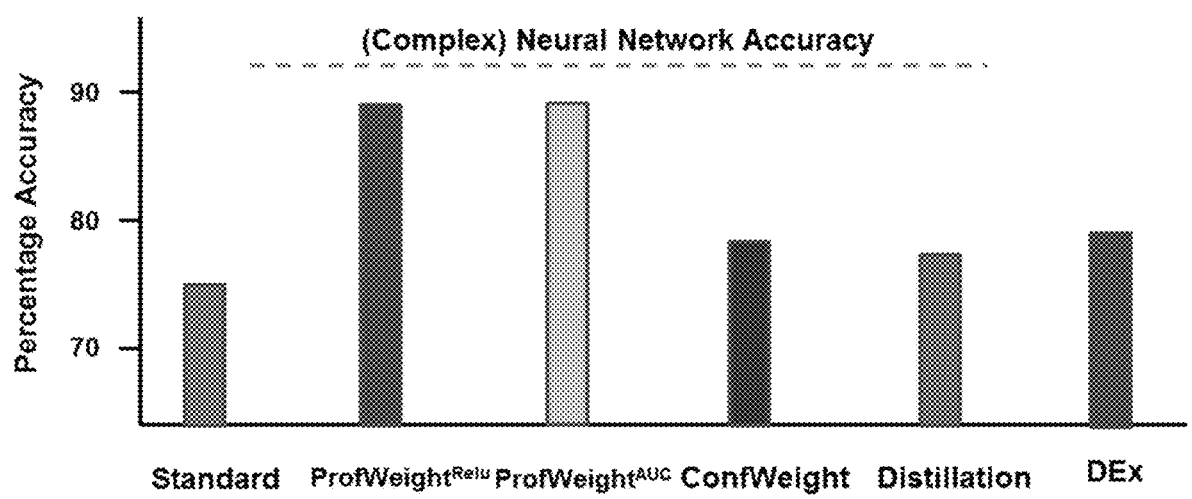
FIG. 10 exemplarily shows a performance of the different methods on a manufacturing dataset.

With reference to FIG. 10, the method 100 not only improved the performance of a CART model, but produced operationally significant results in a semi-conductor manufacturing setting. An etching process in a semi-conductor manufacturing plant is considered. The goal is to predict the quantity of metal etched on each wafer using the method 100—which is a collection of chips—without having to explicitly measure it using high precision tools, which are not only expensive, but also substantially slow down the throughput of a fab. If T denotes the required specification and γ the allowed variation, the target the invention wants to predict is quantized into three bins namely: $(-\infty, T-\gamma)$, $(T+\gamma, \infty)$ and within spec which is $T\pm\gamma$. One thus has a three class problem and the engineers goal is not only to predict these classes accurately, but also to obtain insight into ways that he can improve his process.

For each wafer, the experiment has 5104 input measurements for this process. The inputs include acid concentrations, electrical readings, metal deposition amounts, time of etching, time since last cleaning, glass fogging and various gas flows and pressures. The number of wafers in the dataset was 100,023. Since these wafers were time ordered, the experiment split the dataset sequentially where the first 70% was used for training and the most recent 30% was used for testing. Sequential splitting is a very standard procedure used for testing models in this domain, as predicting on the most recent set of wafers is more indicative of the model performance in practice than through testing using random splits of train and test with procedures such as 10-fold cross validation.

The experiment built a neural network (NN) with an input layer and five fully connected hidden layers of size 1024 each and a final softmax layer outputting the probabilities for the three classes. The NN had an accuracy of 91.2%. The NN was, however, not the model of choice for the fabrication engineer who was more familiar and comfortable using decision trees.

Given this, the experiment trained a CART-based decision tree on the dataset. As seen in FIG. 10, its accuracy was 74.3%. Given the big gap in performance between these two methods, the engineers wanted an improved interpretable model whose insights they could trust. The experiment thus tested by weighting instances based on the actual confidence scores outputted by the NN and then retraining CART. This improved the CART performance slightly to 77.1% (Conf-Weight). The experiment then used 'ProfWeightAUC', where a was set to zero, to train CART whose accuracy bumped up significantly to 87.3%, which is a 13% lift. Similar gains were seen for 'ProfWeightReLU' where accuracy reached 87.4%. For 'Distillation', the experiment tried 10 different temperature scaling in multiples of '2' starting with 0.5. The best distilled CART produced a slight improvement in the base model increasing its accuracy to 75.6%. The experiment also compared with the decision tree extraction (DEx) method which had a performance of 77.5%.

The experiment reported the top features based on the improved model to the engineer using the method 100. These features were included certain pressures, time since last cleaning and certain acid concentrations. The engineer based on this insight started controlling the acid concentrations more tightly. This improved the total number of within specification wafers by 1.3%. Although this is a small number, it has a huge monetary impact in this industry, where even 1% increase in yield can amount to billions of dollars in savings.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 11, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring again to FIG. 11, computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 12:
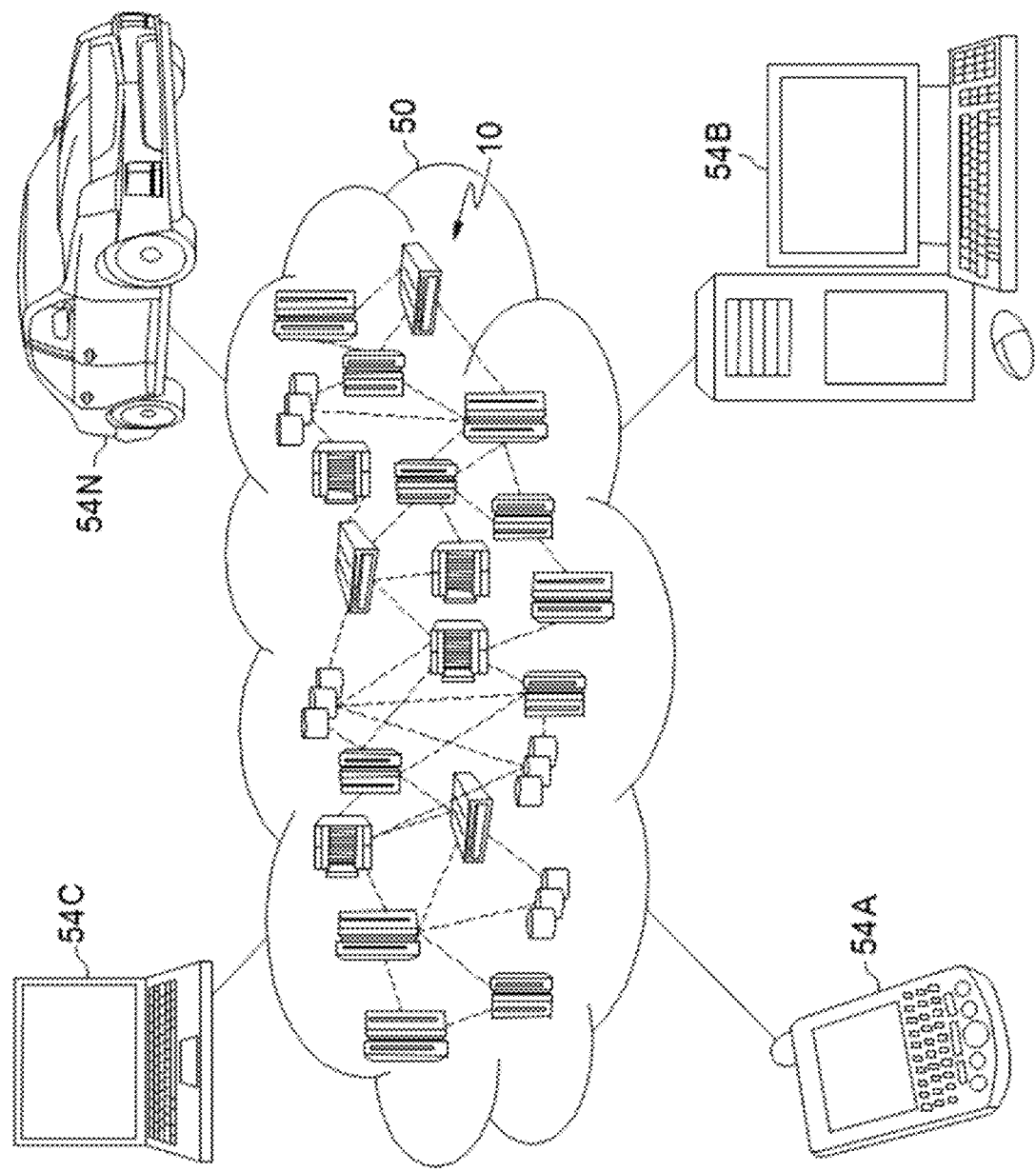
FIG. 12 depicts a cloud computing environment 50 according to an embodiment of the present invention.

Referring now to FIG. 12, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 12 are intended to be illustrative only and that computing nodes 10 and cloud computing environment 50 can communicate with any type of computerized circuit over any type of network and/or network addressable connection (e.g., using a web browser).

Referring now to FIG. 13, an exemplary set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91;

software development and lifecycle management 92; virtual classroom education delivery 93; data analytics processing 94; transaction processing 95; and, more particularly relative to the present invention, the method 100.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented method for improving a simple model using a confidence profile, the method comprising:
    transferring information from a pre-trained complex model including a neural network to the simple model by:
        generating, using a linear probe, confidence scores through flattened intermediate representations of the neural network and learning a regularized neural network that inputs same confidence scores;
        setting weights of samples, by defining a regularization term in the regularized neural network to keep the weights from all going to zero, during a training of the simple model using the confidence scores of the intermediate representations that justify the weights and minimize a loss of the simple model;
        retraining the simple model using the weights that are justified, wherein the simple model includes a lasso model, and wherein the linear probe is added at certain layers of the neural network, the certain layers representing logical units; and
        computing an area under the curve (AUC) traced by the confidence scores at each linear probe for a given input-output pair, wherein the confidence scores are for a true label of a given example instead of a predicted label.

2. The computer-implemented method of claim 1, wherein the generating generates the confidence scores by:
    training the simple model on an original dataset; and
    learning the weights for samples in the original dataset as a function of the simple model and the linear probes.

3. The computer-implemented method of claim 2, wherein the function includes an area under curve (AUC) function.

4. The computer-implemented method of claim 1, wherein the weights are computed via computing an area under a curve (AUC) of the confidence scores of a selected linear probe and then justified in the justified weighting.

5. The computer-implemented method of claim 1, wherein the weights are computed via training the regularized neural network that inputs the same confidence scores of a selected linear probe.

6. The computer-implemented method of claim 5, wherein the regularization term is set to keep the weights in the regularized neural network from going to zero when training the regularized neural network.

7. The computer-implemented method of claim 5, wherein a penalty is imposed on the weights in the learning to prevent the weights from diverging.

8. The computer-implemented method of claim 5, wherein the regularized neural network is trained on batches of data, and
    wherein the regularized neural network represents a function of all training samples.

9. The computer-implemented method of claim 5, wherein the training alternates between minimizing two blocks of variables and when sub-problems have solutions and are differentiable, all limit points of the variables are shown to be stationary points as the learned weights, and
    wherein the simple model is trained with the corresponding learned weights.

10. The computer-implemented method of claim 1, embodied in a cloud-computing environment.

11. The computer-implemented method of claim 1, wherein the simple model is not classified as a neural network.

12. A non-transitory computer program product for improving a simple model using a confidence profile, the computer program product comprising a computer-readable storage medium having program instructions embodied therewith, the program instructions executable by a computer to cause the computer to perform:
    transferring information from a pre-trained complex model including a neural network to the simple model by:
        generating, using a linear probe, confidence scores through flattened intermediate representations of the neural network and learning a regularized neural network that inputs same confidence scores;
        setting weights of samples, by defining a regularization term in the regularized neural network to keep the weights from all going to zero, during a training of the simple model using the confidence scores of the intermediate representations that justify the weights and minimize a loss of the simple model;
        retraining the simple model using the weights that are justified, wherein the simple model includes a lasso model, and wherein the linear probe is added at certain layers of the neural network, the certain layers representing logical units; and
        computing an area under the curve (AUC) traced by the confidence scores at each linear probe for a given input-output pair, wherein the confidence scores are for a true label of a given example instead of a predicted label.

13. The non-transitory computer program product of claim 12, wherein the generating generates the confidence scores by:
    attaching and training a plurality of linear probes on the flattened intermediate representations;
    training the simple model on an original dataset; and
    learning the weights for samples in the original dataset as a function of the simple model and the linear probes.

14. The non-transitory computer program product of claim 13, wherein the function includes an area under curve (AUC).

15. The non-transitory computer program product of claim 12, wherein the weights are computed via training the regularized neural network that inputs the same confidence scores of a selected linear probe and weights of the samples that are set in the setting.

16. The non-transitory computer program product of claim 12, wherein the weights are computed via training the regularized neural network that inputs the same confidence scores of a selected linear probe.

17. The non-transitory computer program product of claim 16, wherein the regularization term is set to keep the weights in the regularized neural network from going to zero when training the regularized neural network.

18. The non-transitory computer program product of claim 16, wherein a penalty is imposed on the weights in the learning to prevent the weights from diverging.

19. The non-transitory computer program product of claim 16, wherein the regularized neural network is trained on batches of data, and
wherein the regularized neural network represents a function of all training samples.

20. The non-transitory computer program product of claim 16, wherein the training alternates between minimizing two blocks of variables and when sub-problems have solutions and are differentiable, all limit points of the variables are shown to be stationary points as the learned weights, and
wherein the simple model is trained with the corresponding learned weights.

21. A system for improving a simple model using a confidence profile, said system comprising:
a processor; and
a memory, the memory storing instructions to cause the processor to perform:
transferring information from a pre-trained complex model including a neural network to the simple model by:
generating, using a linear probe, confidence scores through flattened intermediate representations of the neural network and learning a regularized neural network that inputs same confidence scores;
setting weights of samples, by defining a regularization term in the regularized neural network to keep the weights from all going to zero, during a training of the simple model using the confidence scores of the intermediate representations that justify the weights and minimize a loss of the simple model;
retraining the simple model using the weights that are justified, wherein the simple model includes a lasso model, and wherein the linear probe is added at certain layers of the neural network, the certain layers representing logical units; and
computing an area under the curve (AUC) traced by the confidence scores at each linear probe for a given input-output pair, wherein the confidence scores are for a true label of a given example instead of a predicted label.

22. The system of claim 21, embodied in a cloud-computing environment.

23. A computer-implemented method for improving a simple model using a confidence profile, the method comprising:
transferring information from a pre-trained complex model including a neural network to the simple model by:
generating, using a linear probe, confidence scores through flattened intermediate representations of the neural network and learning a regularized neural network that inputs same confidence scores; and
wherein the generating generates the confidence scores by:
attaching and training the linear probe on the flattened intermediate representations of a neural network;
training the simple model on an original dataset;
learning the weights for samples in the original dataset, by defining a regularization term in the regularized neural network to keep the weights from all going to zero, as an area under curve function of the simple model and the linear probes; and
retraining the simple model on a final weighted dataset while minimizing a loss of the simple model,
wherein the simple model includes a lasso model, and
wherein the linear probe is added at certain layers of the neural network, the certain layers representing logical units; and
computing an area under the curve (AUC) traced by the confidence scores at each linear probe for a given input-output pair, wherein the confidence scores are for a true label of a given example instead of a predicted label.

24. A computer-implemented method for improving a simple model using a confidence profile, the method comprising:
transferring information from a pre-trained complex model including a neural network to the simple model by:
generating, using a linear probe, confidence scores through flattened intermediate representations of the neural network and learning a regularized neural network that inputs same confidence scores; and
wherein the generating generates the confidence scores by:
attaching and training the linear probe on the flattened intermediate representations of a neural network;
training the simple model on an original dataset;
learning the weights for examples in the original dataset, by defining a regularization term in the regularized neural network to keep the weights from all going to zero, as a function of the simple model and the linear probes; and
retraining the simple model on a final weighted dataset while minimizing a loss of the simple model,
wherein the simple model includes a lasso model, and
wherein the linear probe is added at certain layers of the neural network, the certain layers representing logical units; and
computing an area under the curve (AUC) traced by the confidence scores at each linear probe for a given input-output pair, wherein the confidence scores are for a true label of a given example instead of a predicted label.

* * * * *